Feb. 16, 1932.  R. SZEKERES  1,845,361
FIRE STONE HOLDER FOR PYROPHORIC LIGHTERS
Filed Sept. 21, 1929
Fig. 1.
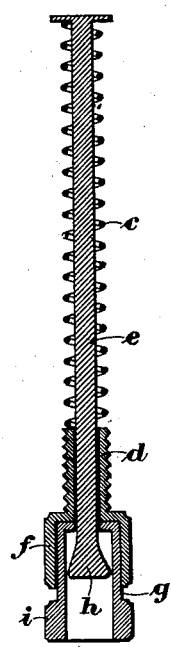
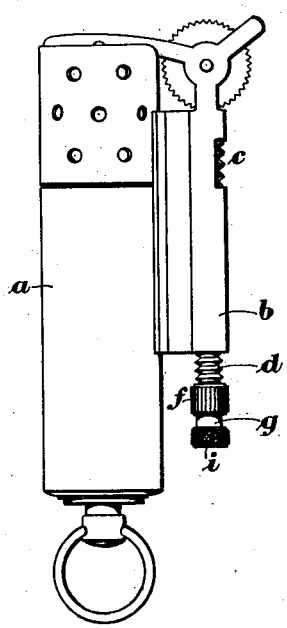
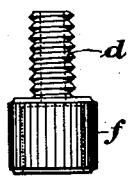
Fig. 3.
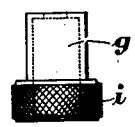
Fig. 2.  Fig. 4.
INVENTOR.
Richard Szekeres.
By Marion & Marion
Attorneys.

Patented Feb. 16, 1932

1,845,361

UNITED STATES PATENT OFFICE

RICHARD SZEKERES, OF MARGYAVOVAR, HUNGARY, ASSIGNOR TO THE FIRM OF VADASZTOLTENY-GYUTACS-ES FEMARUGYAR R. T., OF BUDAPEST, HUNGARY

FIRE STONE HOLDER FOR PYROPHORIC LIGHTERS

Application filed September 21, 1929, Serial No. 394,227, and in Hungary September 2, 1929.

Pyrophoric lighters are known in which pyrophoric alloy (subsequently called flint) is pressed against a friction wheel by means of a small rod provided with top-plate urged in contact with the lower surface of the cylindrical flint by a helical spring through which the rod passes; said spring is placed into a conduit or tube soldered to the fuel tank while a nut in screw-threaded engagement with the inner wall of the tube containing the helical spring is arranged at the lower end of the said tube. Thus, the said rod passes through an axial boring of the said nut, protrudes from the same and is terminated into a knob. The lower end of the helical spring rests on the top part of the nut within the tube, the object being partly to allow an adjusting of the spring tension by turning the nut or to retract the spring and replace the flint through an aperture located in the upper side of the said tube. Such lighters fitted with ferro-cerium flints, however, present the disadvantages that when holding the lighter in the hand for lighting it, the end of the said spring-holding rod generally shaped as a small sphere and projecting beyond the screw adjusting the spring tension comes into contact with the palm exerting a pressure upward upon the flint rendering operation difficult and erratic. Besides, the pressure directed by the palm against the spherical end of the spring-holding rod tends to bend the same out of shape.

The present invention has for its object to do away with this inconvenience and consists in a new form of the sparking mechanism.

The annexed drawings illustrate an embodiment of the ferro-cerium holder according to the invention, shown by way of example.

Fig. 1 is a side elevation of the pyrophoric lighter fitted with the new kind of ferro-cerium holder, Fig. 2 is a vertical longitudinal section of the spring-holding rod and accessories, Fig. 3 is a side elevation of the adjusting screw, and Fig. 4 is a side elevation of the socket.

Referring to the drawings, it will be seen that the device is constituted as follows: A small cylindrical piece of ferro-cerium or other pyrophoric alloy is disposed in a tube $b$, soldered to the body of the fuel tank $a$, in most cases parallel to the axis thereof. A friction wheel provided with teeth is disposed on the upper end of this channel in contact with the flint. For pressing the flint against the wheel a helical spring $c$ is disposed within the above said tube. At the opposite end of the tube a nut $f$ having screw threads $d$ engages the inner wall of the tube $b$ and by compressing the helical spring by the means of turning this nut the tension of the spring $c$ can be adjusted at will. A rod $e$ passing through this nut and the coils of the spring is provided at the upper end with a top-plate and presses the flint against the wheel. A socket $i$ fits into a cavity of the threaded nut $f$ in order that $i$ may move freely in axial direction within the nut $f$. The rod $e$ passes through concentric borings of both the nut $f$ and socket $i$ and is provided with a flattened head $h$ at the lower end. By this means, the rod $e$ transfers the tension of the helical spring to the flint and is made entirely independent of the nut $f$ by which the tension of the spring can be adjusted; furthermore, said rod is thus rendered independent from any outward influence. To protect the lighter flame against draughts the fuel tank is shown provided, at the top thereof, with a perforated windshield within which is situated the usual wick. The spark is produced by holding the lighter in either hand and turning the wheel with the thumb. The spark enters through an aperture in the windshield opposite to the wheel and ignites the wick disposed centrally within the windshield in the usual way.

Having thus described my invention, I claim:—

In a hand lighter having a fuel tank, a wick, a friction wheel and a flint, a flint receiving conduit secured to the side of the tank and having an aperture adjacent the wheel situated above said conduit, a pusher rod for the flint, a coiled spring around said rod to urge the same against the flint, a screw-threaded nut engaging the conduit and having an axial bore wherein the rod passes, and socket means slidably inserted inside a cavity of the nut, concentric with the bore thereof, to protect the free end of the rod from outside influences and permit retraction of the rod, against the action of the spring, to enable removal of the flint through the conduit aperture.

In witness whereof I have hereunto set my hand.

RICHARD SZEKERES.